(12) United States Patent
Pathak et al.

(10) Patent No.: US 9,461,704 B2
(45) Date of Patent: Oct. 4, 2016

(54) METHOD AND APPARATUS FOR INITIATING AND DATA COLLECTION OF SINGLE ENDED LINE TEST ON CUSTOMER PREMISES EQUIPMENT

(71) Applicant: IKANOS COMMUNICATIONS, INC., Fremont, CA (US)

(72) Inventors: Vipin Pathak, Eatontown, NJ (US); Stephen Muccione, Long Valley, NJ (US); Sushil Prabhu, Ocean, NJ (US); Bhupinder Thakur, Bangalore (IN)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/466,216

(22) Filed: Aug. 22, 2014

(65) Prior Publication Data

US 2015/0055692 A1 Feb. 26, 2015

Related U.S. Application Data

(60) Provisional application No. 61/869,224, filed on Aug. 23, 2013.

(51) Int. Cl.
*H04B 1/38* (2015.01)
*H04B 3/46* (2015.01)

(52) U.S. Cl.
CPC ..................... *H04B 3/46* (2013.01)

(58) Field of Classification Search
CPC ......................................................... H04B 3/46
See application file for complete search history.

(56) References Cited

U.S. PATENT DOCUMENTS

| 8,644,169 | B2* | 2/2014 | Cioffi | H04M 3/304 370/248 |
|---|---|---|---|---|
| 2002/0172329 | A1* | 11/2002 | Rashid-Farrokhi et al. | 379/22.02 |
| 2002/0176490 | A1 | 11/2002 | Kamali et al. | |
| 2003/0095591 | A1* | 5/2003 | Rekai et al. | 375/225 |
| 2004/0066913 | A1* | 4/2004 | Kennedy et al. | 379/22 |
| 2006/0251160 | A1* | 11/2006 | Fazlollahi | H04B 3/46 375/222 |
| 2007/0108989 | A1* | 5/2007 | Shi | 324/533 |
| 2008/0165838 | A1* | 7/2008 | Vanderhaegen et al. | 375/224 |
| 2008/0219413 | A1* | 9/2008 | Duvaut et al. | 379/3 |
| 2008/0267392 | A1* | 10/2008 | Raheja et al. | 379/417 |
| 2009/0282292 | A1* | 11/2009 | Squire | H04L 41/0631 714/39 |

(Continued)

FOREIGN PATENT DOCUMENTS

WO WO2007130878 A2 11/2007

OTHER PUBLICATIONS

ITU-T G.996.2, Series G: Transmission Systems and Media, Digital Systems and Networks, Digital sections and digital line system—Access networks, Line Testing for Digital Subscriber lines (DSL).—May 2009, 45 pages.

(Continued)

*Primary Examiner* — Kenneth Lam
(74) *Attorney, Agent, or Firm* — Holland & Hart LLP

(57) ABSTRACT

According to certain aspects, embodiments of the invention relate to methods and apparatuses for performing diagnostics on a loop in a communications system. According to certain aspects, embodiments of the invention include performing SELT from a customer premises side of the loop. According to certain other aspects, embodiments of the invention address the issue of initiating a CPE side SELT procedure and also collecting the diagnostics data while a CPE is offline.

21 Claims, 3 Drawing Sheets

(56) References Cited

U.S. PATENT DOCUMENTS

| | | | | |
|---|---|---|---|---|
| 2009/0323902 A1* | 12/2009 | Dinesh | .............. | H04M 3/306 379/27.01 |
| 2011/0206101 A1* | 8/2011 | Matza | .............. | H04B 3/487 375/222 |
| 2012/0226462 A1 | 9/2012 | Rucker | | |
| 2012/0230475 A1* | 9/2012 | Kristensen | .............. | 379/25 |
| 2012/0294348 A1* | 11/2012 | Kuipers et al. | .............. | 375/224 |
| 2012/0306895 A1 | 12/2012 | Faulkner et al. | | |
| 2013/0170629 A1* | 7/2013 | Flowers | .............. | H04M 3/306 379/23 |
| 2014/0098705 A1* | 4/2014 | Chow et al. | .............. | 370/254 |
| 2014/0126705 A1* | 5/2014 | Levonas | .............. | H04M 11/062 379/1.03 |
| 2014/0133534 A1* | 5/2014 | Shi | .............. | 375/222 |
| 2014/0321623 A1* | 10/2014 | Dardenne et al. | .............. | 379/22.04 |
| 2015/0071336 A1* | 3/2015 | Kerpez et al. | .............. | 375/227 |
| 2015/0163349 A1* | 6/2015 | Ardestani | .............. | H04B 3/46 379/22.02 |

OTHER PUBLICATIONS

International Search Report and Written Opinion issued Dec. 2, 2014 for PCT/US2014/052397.

* cited by examiner

METHOD AND APPARATUS FOR INITIATING AND DATA COLLECTION OF SINGLE ENDED LINE TEST ON CUSTOMER PREMISES EQUIPMENT

CROSS-REFERENCE TO RELATED APPLICATIONS

The present application claims priority to U.S. Prov. Appln. No. 61/869,224 filed Aug. 23, 2013, the contents of which are incorporated herein by reference in their entirety.

FIELD OF THE INVENTION

The present invention relates generally to xDSL communication systems, and more particularly to initiating and collecting data from CPE side SELT.

BACKGROUND OF THE RELATED ART

An xDSL communication system (xDSL refers to various versions of digital subscriber line systems such as ADSL, VDSL, VDSL2, etc.) consists of Central Office (CO) equipment (i.e. DSLAM) and customer premises equipment (CPE) using the twisted pair wire as a communication channel. In order to provide reliable service, several test standards and metrics have been developed to measure quality of service (QoS), one such standard is referred to in G.996.2 as Single Ended Line Testing for DSL.

Single Ended Line Testing (SELT) is an offline diagnostics procedure, and in general SELT is used at the central office side and is thereby controlled and initiated by the central office/network management system. The CO side SELT diagnostics are initiated by the central office management system either on demand or periodically, as required.

However, it may be desirable to initiate a SELT procedure and collect the diagnostics data from the CPE side. Currently, to initiate SELT on the CPE side, a technician has to visit the customer premises and manually initiate such diagnostics and collect the data. This obviously is an expensive and time consuming task.

Accordingly, there is a need in the art for techniques for a CPE to autonomously initiate and/or perform diagnostics such as SELT from the CPE side.

SUMMARY OF THE INVENTION

According to certain aspects, embodiments of the invention relate to methods and apparatuses for performing diagnostics on a loop in a communications system. According to certain aspects, embodiments of the invention include performing SELT from a customer premises side of the loop. According to certain other aspects, embodiments of the invention address the issue of initiating a CPE side SELT procedure and also collecting the diagnostics data while a CPE is offline.

In accordance with these and other aspects, a method according to embodiments of the invention includes configuring a customer premises equipment (CPE) to initiate a single ended line test (SELT) procedure according to configuration parameters; when the CPE is offline, causing the CPE to perform the SELT procedure according to the configuration parameters; and at the CPE, collecting diagnostics data resulting from the performed SELT procedure.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present inventors recognize that performing SELT from the customer premises (e.g. a home) has a unique advantage of providing more insight and accurate information regarding loop topology and noise environment in-house and near the house, which is not accessible using the SELT diagnostic procedure on the CO end. The present inventors further recognize that, SELT being an offline diagnostics procedure, the central office management interface cannot control the CPE side SELT directly. However, for the service providers, CPE side SELT diagnostics can provide complementary information regarding the loop topology and noise environment near and inside the house. This additional information from the CPE can be quite valuable in terms of providing a holistic view of the communication channel and thereby improving the QoE for the end consumer and also reducing operating expenses. Accordingly, there is a need for methods and apparatuses for initiating and performing CPE side SELT and conveying the results to the CO.

Figure 1:
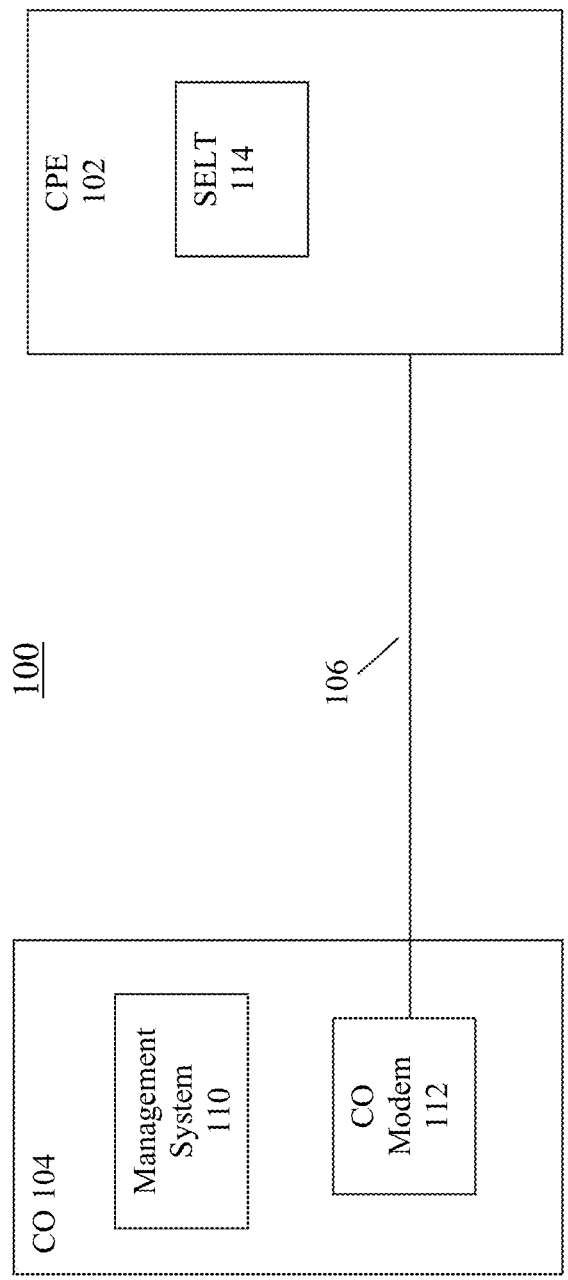
FIG. 1 is a block diagram illustrating an example system in which embodiments of the invention can be implemented.

FIG. 1 is a block diagram illustrating an example system 100 in which embodiments of the invention can be implemented. As shown in FIG. 1, a CPE device 102 is coupled to a CO modem 112 in CO 104 via loop 106. In one non-limiting example, system 100 can be a DSL system operating according to VDSL2. However, the invention is not limited to this example.

As set forth above, in wired communication systems (such as DSL, cable modem etc.) loop topology and noise diagnostics are often based on analyses of SELT data. For example, CO management system 110 can initiate diagnostics to characterize loop 106 using SELT signals transmitted by CO modem 112 on loop 106 and reflected back to CO modem 112. Specifically, in an example wherein system 100 is operating according to VDSL2, a conventional SELT performed by CO modem 112 can include continuously transmitting symbols (e.g. modulated REVERB symbols) each VDSL2 symbol period for a period of about 5 seconds to about 2 minutes, and measuring the reflections (i.e. obtaining S11 data) from loop 106. It should be noted that other CPE's coupled to CO modem 112 via other loops (not shown) can be operating in Showtime using the same symbol periods while CO modem 112 performs SELT tests on loop 106. Similarly for noise environment analysis inside and near the customer premises, SELT quiet line noise measurements can be performed by listening to noise on the line without transmitting anything on the line.

As shown in FIG. 1, and in contrast to conventional approaches, CPE device 102 includes SELT apparatus 114 for initiating and performing CPE side SELT according to aspects of the invention.

Figure 2:
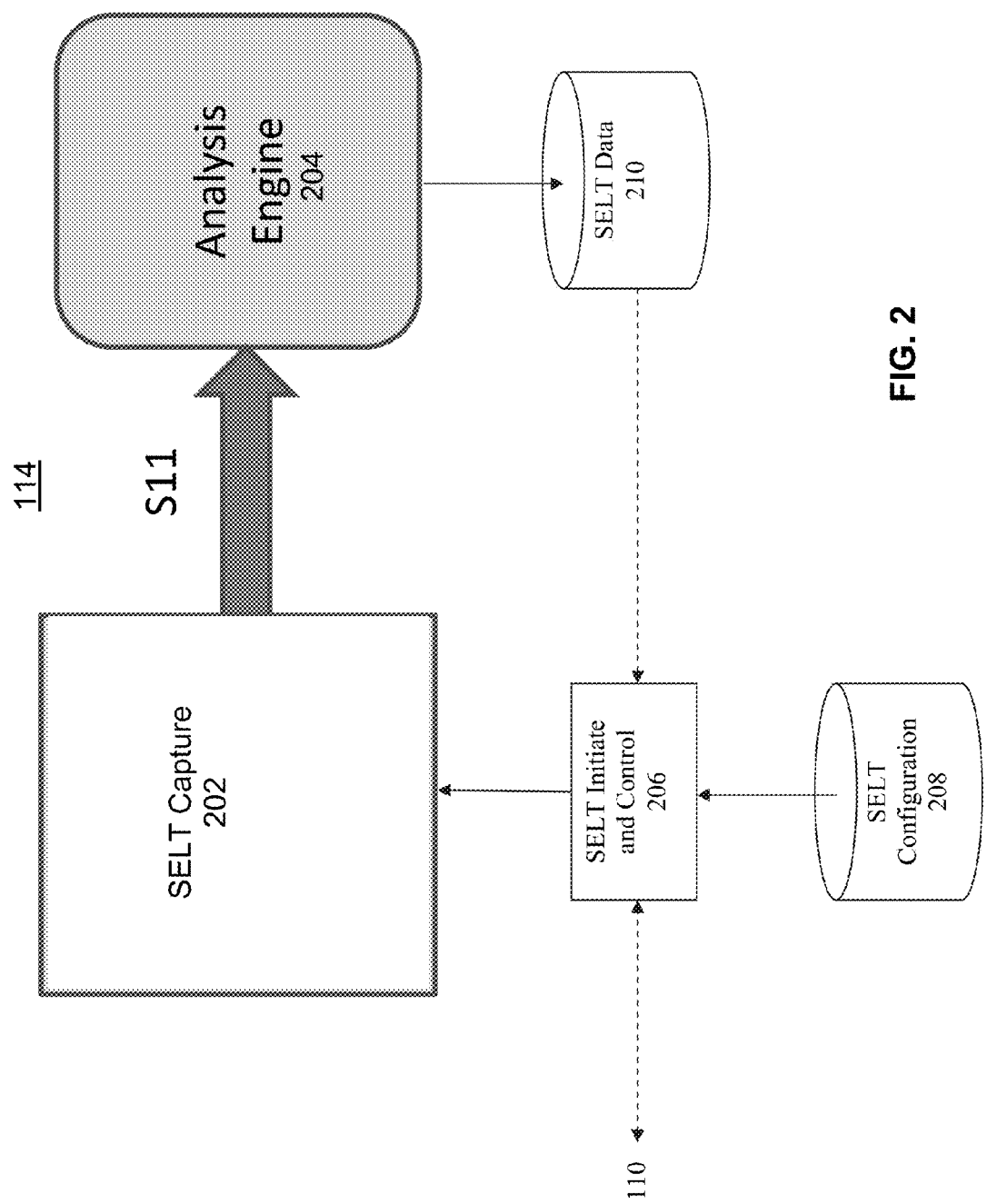
FIG. 2 is a block diagram illustrating an example CPE side SELT apparatus according to embodiments of the invention.

A block diagram illustrating an example SELT apparatus 114 according to embodiments of the invention is shown in FIG. 2. As shown, apparatus 114 includes a SELT capture block 202, analysis engine 204, SELT initiate and control block 206, SELT configuration data 208 and SELT data 210.

SELT capture block 202 includes functionality for forming SELT signals, transmitting the signals on the loop 106, measuring the reflections from the loop 106, and providing the S11 reflection data to analysis engine 204. In embodiments, SELT signals formed and transmitted by block 202 can comprise symbols (e.g. modulated REVERB symbols) constructed from tones in one or more xDSL bands or utilizing a custom frequency range relevant to xDSL or other communications technology such as cable modem, etc. As mentioned above, similar or different frequency ranges can be utilized to perform SELT quiet line noise measurements, for noise environment analysis as an example. SELT capture block 202 can be implemented using techniques known to those skilled in the art, and so further details thereof will be omitted here for sake of clarity of the invention.

Analysis engine 204 receives the S11 reflection data from capture block 202. In embodiments, engine 204 analyzes the S11 reflection data using any conventional or proprietary method and stores results in SELT data 210. Example SELT analyses that can be performed include one or more of those described in co-pending application Ser. nos. 14/339,862, 14/341,538 and 14/341,576, the contents of each of which being incorporated herein by reference in their entireties. It should be noted that in some embodiments, analysis engine 204 is not included in CPE 102 and/or SELT data 210 can include raw collected data that is provided to another device (e.g. CO management system 110 or a central analysis server such as one hosted in the Cloud) for analysis.

SELT initiate and control block 206 includes functionality for initiating the SELT capture and analysis performed by blocks 202 and 204 according to configurations stored in 208. SELT initiate and control block 206 can optionally also include functionality for communicating with CO management system 110 to provide SELT data 210 to CO management system 110 and/or to receive SELT configuration data 208. In embodiments, configuration data 208 includes parameters for determining a time and/or frequency and/or power spectral density (PSD) of the transmit signal for initiating SELT.

As shown in FIG. 1, according to aspects of the invention, apparatus 114 is incorporated in CPE device 102. In these and other embodiments, CPE device 102 (as well as CO modem 112) include DSL transceivers (e.g. VX180 from Ikanos Communications, Inc.) having conventional processors, chipsets, firmware, software, etc. that implement communication services such as those defined by VDSL2, ADSL2, etc. Moreover, in these and other embodiments, apparatus 114 can be implemented by adapting SELT functionality such as that provided by diagnostics suites such as SmartCPE provided by Ikanos Communications, Inc. Those skilled in the art will be able to understand how to adapt such processors, chipsets, firmware, software, etc. to implement the SELT functionalities of the present invention after being taught by the above and following examples.

As an example, embodiments of the invention can be implemented using an Application Programming Interface (API) to configure, initiate and collect data from SELT diagnostics. To configure various parameters of SELT for loop topology and noise measurement, the API can include a "SeltConfig( )" interface with the following, but not limited to, input parameters: time duration of the test/measurement, frequency range used for such measurement, transmit signal PSD used when probing for loop topology, SELT type, mode, particular date and/or day and/or time and/or periodicity of initiation. Here, the parameter "mode" can be any or all of the constants 27, 28, 29, 30, 31, which correspond to the initiation techniques described in more detail below, and the parameter "SELT type" can select SELT measurement for loop topology probing and/or SELT measurement for noise probing, or both. These configuration parameters 208 are persistent in memory unless they are explicitly commanded to be changed either manually or automatically by feedback from the analysis engine 204. The "SeltConfig" can also have an output parameter such as "Status," which indicates the current configuration settings. Similar interfaces can be used for initiating SELT and data collection, which are used in accordance with the SeltConfig( ), which configures the SELT parameters.

Figure 3:
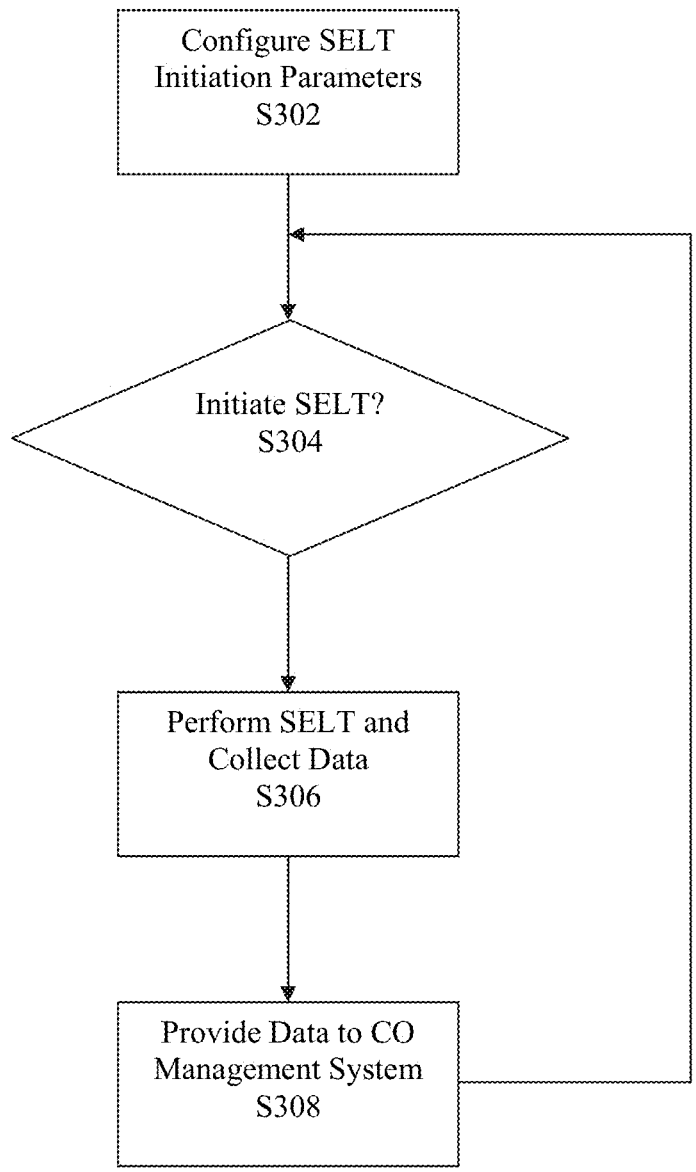
FIG. 3 is a flowchart illustrating an example CPE side SELT methodology according to embodiments of the invention.

A flowchart illustrating an example CPE side SELT methodology that can be performed by apparatus 114 according to embodiments of the invention is shown in FIG. 3.

As shown, in a first step S302, parameters for initiating and performing CPE side SELT are configured in SELT configuration 208. In step S304, SELT initiate and control block 206 determines from the configuration whether to initiate SELT. If so processing, advances to step S306, where SELT capture block 202 and analysis engine 204 perform SELT and collect SELT data in store 210. This step S306 may include taking the CPE offline if it is currently online or in Showtime. In a final optional step S308, the SELT data is provided to CO management system 110 and processing returns to step S304. It should be noted that in addition to returning to step S304, and perhaps before step S308, processing may include returning the CPE to an online or Showtime state if appropriate.

Step S306 can include any conventional or proprietary SELT technique, including those described in the co-pending applications. Accordingly, further details thereof will be omitted here for sake of clarity of the invention. Details of example implementations of the methodology performed in the other steps depicted in FIG. 3 are provided below.

Initiation on CPE Power-Up

A first example implementation consists in step S302 of configuring apparatus 114 to autonomously initiate and perform a SELT procedure with default configuration parameters stored in 208, every time the CPE device 102 is powered up. The output SELT data 210, along with the configuration data 208 are stored in the CPE memory along with an associated time-stamp indicating the actual time when the diagnostics procedure was performed. The diagnostics data can be transferred by block 206 to the central office management system 110 via CO modem 112 or any other third party management system, once the CPE device 102 is online and regains connectivity. In the event that connectivity is not resumed, the diagnostics data 210 can be accessed from the CPE device 102 via local access (e.g. service technician). For example, the modem 102 can include web server, http interface or ftp server functionality (e.g. incorporated into SELT initiate and control block 206) by which a technician can interact with device 102 to access and transfer the data 210 using an Ethernet cable, Wi-Fi and conventional network protocols. Such web server, http interface or ftp server functionality can additionally or alternatively be used to allow the CPE device 102 to communicate data 210 with third party or other management systems in the Cloud via the Internet.

Autonomous Initiation on Line Drop, Before Attempting Retrain

A next example implementation consists in step S302 of configuring apparatus 114 to autonomously initiate a SELT procedure with set configuration parameters stored in 208, every time there is a line drop, just before attempting a retrain. The output SELT data 210, along with the configuration data 208 are stored in the CPE memory along with an associated time-stamp indicating the actual time when the diagnostics procedure was performed. The diagnostics data 210 can be transferred to the central office management system 110 via CO modem 112 or any other third party management system, once the CPE modem 104 is online and regains connectivity. In the event that connectivity is not resumed, the diagnostics data 210 can be accessed from the CPE device 102 via local access (e.g. service technician) similar to the implementation described above. For this example, the configuration parameters 208 for performing SELT can be communicated by the central office management system 110 or third party management interface to apparatus 114 (e.g. SELT initiate and control block 206) via conventional protocols such as CPE WAN Management Protocol (CWMP) (i.e. TR-069), etc. In these and other embodiments, the configuration parameters can also indicate whether or not to initiate SELT on the next line drop event.

Periodic Initiation

A next example implementation consists in step S302 of configuring apparatus 114 to periodically initiate the SELT procedure at specified time intervals with set configuration parameters stored in 208. The time interval or the time period including the configuration parameters can be configured by central office management system 110 via CO modem 112 or a third party management interface using an API such as the "SetConfig" interface described above. In embodiments, SELT being an offline diagnostics procedure, once the window to initiate SELT has arrived (as determined in step S304), SELT initiate and control block 206 can monitor user traffic and wait to take the CPE 102 offline and initiate the SELT procedure during off-peak hours and/or when there is no or minimal user traffic.

Remote on Demand Initiation

A next example implementation consists in step S302 of remotely configuring apparatus 114 initiate the SELT procedure on demand using a communicated set configuration parameters 208. In embodiments, this example includes central office management system 110 via CO modem 112 or a third party management system instructing block 206 via CWMP or other protocol to immediately or at a specified time initiate the SELT procedure with the communicated parameters. In cases where the line is not in Showtime or the modem is not able to immediately get access to the Internet, the output diagnostics data 210, along with the configuration data, are stored in CPE memory along with an associated time-stamp indicating the actual time when the diagnostics procedure was performed. The diagnostics data can then be transferred to the central office management system 110 or any other third party management system, once the CPE modem 104 is online and regains connectivity. In the event that connectivity is not resumed, the diagnostics data 210 can be accessed from the CPE device 102 via local access (e.g. service technician) similar to the implementation described above.

Local Initiation Using Direct Access to the CPE

A next example implementation consists in step S302 of locally configuring apparatus to immediately initiate the CPE side SELT procedure using direct access to the CPE device 102. This example can be used during an installation procedure by a technician or at the time of a troubleshooting visit by the technician. The output diagnostics data 210, along with the configuration data are accessed immediately by the local technician using direct access to the CPE device 102 via a web page or any other http interface similar to that described above. The same diagnostics data 210 can also be transferred by block 206 to the central management system 110 via CO modem 112 once CPE device 102 resumes connectivity.

It should be noted that the above example implementations are not mutually exclusive. For example, some or all of these example methods can be performed by the same CPE device 102 having a SELT apparatus 114 according to embodiments of the invention over its lifetime.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
 receiving, by a customer premises equipment (CPE), configuration parameters associated with performing one or more single ended line test (SELT) procedures;
 detecting, by the CPE, a line drop on a Central Office (CO) side of a loop for communicating between the CPE and CO equipment;
 performing, by the CPE and based at least in part on the determined line drop, a first SELT procedure, the first SELT procedure being directed to a customer premise side line and performed prior to a retrain procedure;
 collecting, by the CPE, diagnostics data resulting from the one or more performed SELT procedures.

2. The method of claim 1, wherein the first SELT procedure comprises a loop topology measurement.

3. The method of claim 2, wherein the first SELT procedure includes transmitting symbols from the CPE on the customer premise side line coupled to the CPE and measuring reflections at the CPE.

4. The method of claim 3, wherein the measured reflections comprise S11 data.

5. The method of claim 1, wherein the first SELT procedure comprises a quiet line noise measurement.

6. The method of claim 1, further comprising:
performing, by the CPE, a second SELT procedure of the one or more SELT procedures during a power-up of the CPE.

7. The method of claim 1, further comprising:
periodically performing, by the CPE, the one or more SELT procedures.

8. The method of claim 1, further comprising:
determining, by the CPE, that a time window for performing a third SELT procedure has arrived;
monitoring, by the CPE and based at least in part on the determined arrival of the time window, the loop for user traffic;
taking the CPE offline to perform the third SELT procedure when user traffic is not detected while monitoring the loop.

9. The method of claim 1, further comprising:
receiving, by the CPE, an indication to immediately perform a fourth SELT procedure.

10. The method of claim 1, further comprising:
locally configuring the CPE to immediately perform a fifth SELT procedure.

11. The method of claim 1, further comprising:
storing, by the CPE, the configuration parameters.

12. The method of claim 11, wherein receiving the configuration parameters comprises communicating in compliance with CPE WAN Management Protocol (CWMP).

13. The method of claim 1, further comprising:
storing, by the CPE, the collected diagnostics data; and
when the CPE is online, communicating the collected diagnostics data to the CO equipment.

14. The method of claim 1, further comprising communicating the collected diagnostics data to a technician via a local interface.

15. A communications device, comprising:
a processor and memory communicatively coupled to the processor, the memory comprising computer-readable code that, when executed by the processor, causes the communications device to:
receive configuration parameters associated with performing one or more single ended line test (SELT) procedures;
detect a line drop on a Central Office (CO) side of a loop for communicating between the communications device and CO equipment;
perform, based at least in part on the determined line drop, a first SELT procedure, the first SELT procedure being directed to a customer premise side line and performed prior to a retrain procedure; and
collect diagnostics data resulting from the one or more performed SELT procedures.

16. The communications device of claim 15, wherein the computer-readable code that, when executed by the processor, further causes the communications device to:
perform a second SELT procedure of the one or more SELT procedures during a power-up of the CPE the first SELT procedure comprises a loop topology measurement.

17. The communications device of claim 15, wherein the computer-readable code that, when executed by the processor, further causes the communications device to:
periodically performing the one or more SELT procedures.

18. The communications device of claim 15, wherein the computer-readable code that, when executed by the processor, further causes the communications device to:
determine that a time window for performing a third SELT procedure has arrived;
monitor, based at least in part on the determined arrival of the time window, the loop for user traffic;
take the CPE offline to perform the third SELT procedure when user traffic is not detected while monitoring the loop.

19. The communications device of claim 15, wherein the computer-readable code that, when executed by the processor, further causes the communications device to:
receiving an indication to immediately perform a fourth SELT procedure receiving, by the CPE, an indication to immediately perform a fourth SELT procedure.

20. The communications device of claim 15, wherein the computer-readable code that, when executed by the processor, further causes the communications device to:
locally configure the CPE to immediately perform a fifth SELT procedure.

21. The communications device of claim 15, wherein the computer-readable code that, when executed by the processor, further causes the communications device to:
store the collected diagnostics data; and
when the CPE communications device is online, communicating the collected diagnostics data to the CO equipment.

* * * * *